July 21, 1964 G. HAJIAN 3,141,325

SPECIMEN ACCELERATION LIMITER FOR VIBRATION EXCITER

Filed Dec. 30, 1958

INVENTOR
GABRIEL HAJIAN
BY
Byerly, Townsend, Watson & Churchill
ATTORNEYS.

United States Patent Office 3,141,325
Patented July 21, 1964

3,141,325
SPECIMEN ACCELERATION LIMITER FOR
VIBRATION EXCITER
Gabriel Hajian, East Haven, Conn., assignor to Textron
Electronics, Inc., a corporation of Delaware
Filed Dec. 30, 1958, Ser. No. 783,785
8 Claims. (Cl. 73—71.6)

The present invention relates to vibration exciter systems and more particularly to apparatus for limiting the peak value of acceleration at the surface of the vibration table and thereby preventing damage to a specimen thereon.

A typical system for vibration testing usually includes an electrodynamic vibration exciter, a power amplifier for supplying exciting voltage to the driving coil of the exciter, and a source of test signals which are fed to the power amplifier. Depending upon the nature of the test to be performed, the source of test signals might be either sinusoidal in nature or of random character, or the like. With sinusoidal excitation it is a rather simple matter to control and limit the acceleration imparted to the specimen, but this is not the case with random noise excitation as used in random motion testing.

When employing a noise generator as the source of signals for random motion testing, the magnitude of the signal is normally measured in terms of the root mean square (R.M.S.) value of the voltage or motion. It is impossible to predict the acceleration at any given moment, and, therefore, an acceleration limiter is essential when a noise source is employed.

The frequency response characteristic of an exciter with an attached specimen is characterized by a number of resonances. However, by including appropriate equalization before the exciter it is possible to render the acceleration of the exciter table closely proportional to the voltage at the input to the equalizers over the range of frequencies of interest. The acceleration limiter of the present invention is intended to be used, therefore, in conjunction with an equalized system and to be located at a point in the system, e.g., before the equalizers, where the signal voltage is proportionally related to the acceleration of the exciter table.

It has already been mentioned that the R.M.S. value of a random signal or motion is used to define its magnitude. A typical test specification will require a specimen to be subjected to a particular R.M.S. level of random motion for a given period of time. It has been determined that peak acceleration should normally be limited to between 3 and 5 times the R.M.S. level. Thus, if the R.M.S. level of random acceleration is 10 g then limiting should occur at from 30 g to 50 g peak.

For convenience a normalized unit, "sigma" may be used to designate the R.M.S. level. That is, the R.M.S. level of the table acceleration, whatever it might be adjusted to, is designated as the one sigma level. Then limiting should occur at 3 to 5 sigma. This will be explained in further detail after description of the apparatus embodying the invention. For the present, it will be sufficient if it is understood that in order for a limiter to operate on the basis of the normalized function, sigma, it is not necessray that the signal gain remain constant between the limiter and the exciter. On the contrary, the gain may be varied to establish the one sigma level at any R.M.S. value whereupon limiting will still take place at the preset multiple of sigma.

One further factor that should be understood is that the R.M.S. level of a random motion or signal is affected by the bandwidth thereof. More specifically, the R.M.S. level is proportional to the square root of the bandwidth if it can be assumed that the acceleration density is constant over the frequency range of interest. The acceleration density is a quantity used to describe the energy distribution of random motion.

Thus, in order to obtain limiting of the type mentioned, there is provided in accordance with the present invention an acceleration limiter comprising an adjustable lever clipper circuit with a manual control having settings representing relaitve clipping level and calibrated in arbitrary units, an indicator coupled with the clipper circuit for indicating when clipping is taking place, and an adjustable gain amplifier for adjustably amplifying the signals fed to the clipper circuit, the amplifier including means for determining its adjustment at the appropriate level for exactly compensating for a change in gain before the limiter caused by an alteration of the bandwidth of the signals supplied to the limiter whereby the system gain preceding the clipper circuit can be maintained constant.

The invention will be better understood after reading the following detailed description of a particular embodiment thereof with reference to the appended drawing in which.

Figure 1:
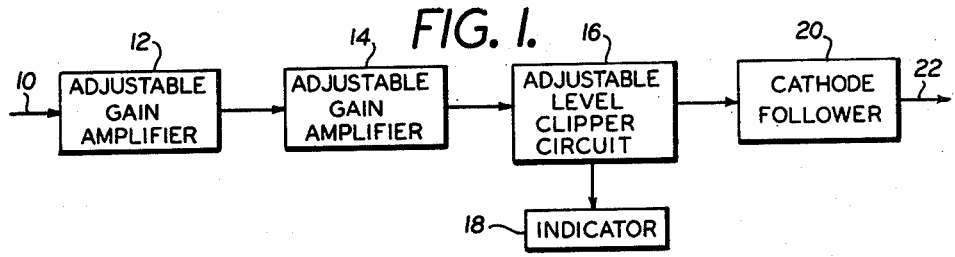
FIG. 1 is a block diagram of the components of an acceleration limiter constructed in accordance with the present invention.

Referring now to FIG. 1 of the drawing, there is shown diagrammatically components of the acceleration limiter. The input 10 of the limiter is fed through two adjustable gain amplifiers 12 and 14 to the adjustable level clipper circuit 16. An indicator 18 is coupled to the clipper circuit for indicating when clipping is taking place. The output of the clipper circuit is supplied through a cathode follower 20 to the output 22 of the limiter.

Because of the wide flat frequency response and low distortion level, operational amplifiers can be used to advantage for the adjustable gain amplifiers 12 and 14. It is believed that these amplifiers are sufficiently well known that a detailed description is unnecessary. Suffice it to say that they are characterized by a large amount of negative feedback and the gain can be conveniently controlled by the inclusion of a variable resistor or potentiometer in the feedback path. For the purpose of the present discussion it may be assumed that the main gain control for each of the amplifiers takes such form. As will appear more clearly hereinafter the first amplifier, 12, is provided additionally with a range changing switch (not shown in FIG. 1) for altering the range of the main control. The range changing mechanism may be merely a number of different size resistors which can be connected selectively in series with the input of the amplifier.

The adjustable level clipper circuit 16 and indicator 18 may take any form known to those skilled in the art although it is preferred to employ biased diode clipping. An arrangement particularly well suited for this purpose is described and claimed in the co-pending application of Charles E. Maki, Serial No. 783,915 filed December 30, 1958, now Patent No. 3,054,097, and assigned to the same assignee as the present application.

In known manner the cathode follower 20 is included for providing a low impedance output.

Figure 2:
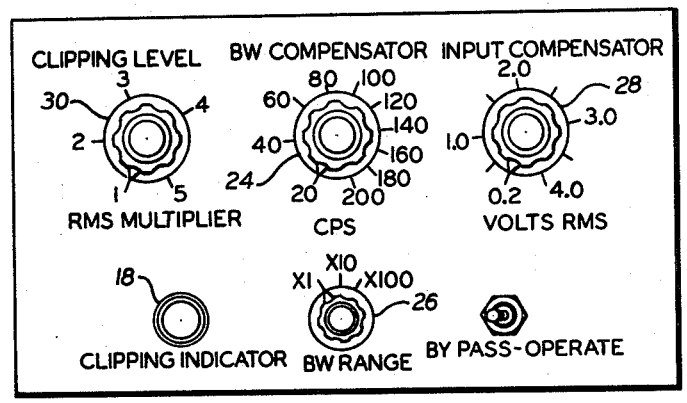
FIG. 2 is a front view of a typical control panel for use with the limiter of FIG. 1 showing the various adjustment calibrations.

The operating controls for the limiter are shown in FIG. 2. The main control for the gain of amplifier 12 is illustrated in the form of an adjustment knob 24 under the heading "BW Compensator." The "BW" represents an abbreviation for bandwidth. The knob 24 is associated with a dial calibrated in terms of cycles per second of bandwidth with the calibration following a square law. The calibration should be such that the R.M.S.

gain of the amplifier 12 at any selected setting is approximately inversely proportional to the square root of the bandwidth corresponding to that setting.

The range adjustment previously referred to for amplifier 12 is here represented by a selector switch 26 bearing the calibrations, "X1" "X10" "X100." The position of this control qualifies the setting of the knob 24 in known manner.

An adjustment knob 28 under the heading "Input Compensator" is provided for regulating the gain of the amplifier 14. The dial calibration associated with the adjustment is linear and in units of "Volts R.M.S."

The clipping level of the clipper circuit 16 is regulated by the control 30 under the heading "Clipping Level." It is associated with a linear dial calibration in arbitrary units. The designation "R.M.S. Multiplier" may also be applied thereto. This adjustment can be arranged to vary the bias on the clipper circuit in order to determine the clipping level in known manner.

Also in FIG. 2 is the clipping indicator 18 (here represented as a signal lamp) and a switch labeled "By Pass-Operate." The latter is optional and may be included in circuit with a shunt path around the acceleration limiter in order to eliminate the limiter from the overall exciter system in a convenient manner when desired.

It should be apparent that the labels appearing in FIG. 2 are merely discretionary and can be changed if desired. More important, it should be understood that the compensating functions of the amplifiers 12 and 14 may be interchanged without altering the basic operation of the limiter.

In order to explain the set-up procedure and operation of the acceleration limiter it is first necessary to consider its place in an overall exciter system. For this purpose reference should now be had to FIG. 3. An adjustable sine wave generator 32 and an adjustable noise generator 34 are coupled to a switch 36 for selective connection to the input of an adjustable band-pass filter 38 having one adjustment 40 for the low frequency end of the band and a second adjustment 42 for the high frequency end of the band. As shown, the output of the band-pass filter 38 is supplied to the acceleration limiter 44 and also to the fixed terminal 46 of a selector switch 48. The selector switch 48 has a second fixed terminal 50 connected to the output of the acceleration limiter and has its movable contact 52 connected to the input of a true R.M.S. voltmeter 54. It should be apparent that the switch 48 serves to selectively connect the voltmeter 54 to either the input or the output of the acceleration limiter.

The output of the acceleration limiter is also fed to the equalizers 56 which function in the manner previously described. For a purpose which will hereinafter be discussed, the output of the equalizers is fed through an adjustable low pass filter 58 to a pre-amplifier 60 and then through a master gain control 62 to a displacement limiter 64. Although it forms no part of the present invention, the displacement limiter may preferably take the form described and claimed in my co-pending application Serial No. 783,914, filed December 30, 1958, now Patent No. 3,068,418. As described in that application the signal is subjected to integration, is then clipped or limited, and finally differentiated in order to provide a resultant signal free from excessive displacement developing signal components. The output of the displacement limiter 64 is then fed through a power amplifier 66 to the exciter 68. For the purpose of measuring the actual acceleration of the exciter table, the latter may be coupled to an accelerometer 70 providing an output signal proportional to acceleration which is supplied through an amplifier 72 to a vacuum-tube voltmeter 74. The latter may be calibrated directly in units of acceleration.

Although there are various arrangements for equalizing vibration exciter systems it is preferred to employ an Exciter Equalizer as described and claimed in the co-pending application of Theron Usher, Jr., Serial No. 720,234, now Patent No. 3,026,480, and Peak-Notch Equalizers as described and claimed in the co-pending application of Theron Usher, Jr., Serial No. 720,235, now Patent No. 2,917,626, both filed March 10, 1958, and both assigned to the same assignee as the present application.

In order to employ the acceleration limiter for limiting at a given number of times the one sigma or R.M.S. level as previously described, it is necessary to follow the following set-up procedure. With the switch 36 connected to the sine-wave generator 32 a low frequency signal, e.g. 100 c.p.s., can be fed through the filter 38 to the acceleration limiter 44. The true R.M.S. voltmeter 54 should be connected by manipulation of switch 48 to the output of the acceleration limiter. The band-pass filter 38 is not necessary during this phase of the operation and should be suitably by-passed or otherwise adjusted so as not to interfere with the signal supplied to the acceleration limiter. Next, the clipping level control 30 should be adjusted, preferably to the middle of its range. In the instant case this would involve setting the control 30 opposite the dial marking 3. The magnitude of the signal supplied to the acceleration limiter should now be gradually increased by the use of a suitable gain control in known manner until the clipping indicator 18 just begins to indicate clipping. Now the voltage at the output of the acceleration limiter should be read on the true R.M.S. voltmeter 54.

With the reading as obtained above, it is now possible to compute the limiting level of the clipper circuit by use of the following equation:

$$\text{Limiting level} = \frac{1.414 \times \text{R.M.S. level measured}}{3}$$

By way of example, if it is assumed that the R.M.S. level read off the voltmeter 54 is 3.2 volts, upon substituting this figure in the above equation the limiting level will be found to be equal to approximately 1.5 volts. This means that the output of the limiter can not exceed 1.5 volts peak if the clipping level control is set opposite 1, 3.0 volts peak if the control is set opposite 2, and so forth. By including a further potentiometer adjustment in the output of the acceleration limiter it is possible to adjust the limiting level to any desired value within a given range of adjustment.

Now that the limiting level of the acceleration limiter has been determined the clipping level should be adjusted to the maximum position (e.g., 5) and the input compensator set to its minimum gain position which here corresponds to the setting 4.0. In this phase of the operation the band-pass filter is required and should be placed in operation. The switch 36 should now be moved to the position shown in the drawing so as to connect the noise generator 34 into the circuit. With the low cut-off frequency limit of the band-pass filter set at some convenient low level such as 10 c.p.s. by the control 40 and the high cut-off limit set to a convenient value such as 2010 c.p.s. by the control 42 there is established a definite bandwidth for the noise signals fed to the acceleration limiter. With the figures chosen above the bandwidth is 2000 c.p.s. Therefore, the bandwidth compensator adjustments 24 and 26 on the acceleration limiter should be adjusted to this particular value. That is, the range adjustment should be set at X10 while knob 24 is set opposite the figure 200. With the voltmeter 54 still connected to the output of the acceleration limiter the level of the noise signal supplied to the limiter 44 is gradually increased until the reading on the meter 54 is equal to the limiting level value computed by the formula set out above. With the figures used by way of example, the meter should now read 1.5 volts R.M.S. This completes the set-up of the limited. The clipping level control 30 may now be set at any desired level and it will limit the peak voltage at the output to the selected number of times the one sigma level (e.g., the selected number of times 1.5 volts).

If the bandwidth should be altered for any reason by changing the adjustment of the band-pass filter 38, it is only necessary to reset the controls 24 and 26 to the corresponding bandwidth. Since the reduction in R.M.S. level of the noise signal is proportional to be square root of the bandwidth it should be understood that the comparable adjustment of the compensator amplifier 12 maintains constant the level of the signal supplied to the clipper circuit 16 (see FIG. 1).

If it is desired subsequently to alter the level of the voltage output of the noise generator, the acceleration limiter will have to be adjusted accordingly. For this purpose the voltmeter 54 should be connected by the switch 48 to the input of the acceleration limiter prior to the change in voltage and a reading taken. Now the noise generator signal may be reduced and the change noted at the voltmeter 54. In order to compensate for this change in level, the dial 28 (FIG. 2) should be adjusted to a proportionally lower setting. In other words, if the voltage measured at the input of the acceleration limiter should be reduced by one half, then the dial 28 should be moved from the setting 4.0 to the setting 2.0. It will be understood from the foregoing that as the setting of the dial 28 is increased the gain of the amplifier 14 is decreased. What is required is that the gain of the amplifier 14 be adjustable to exactly compensate for any change in gain preceding the acceleration limiter caused by a change other than a change in bandwidth of the signals.

Figure 3:
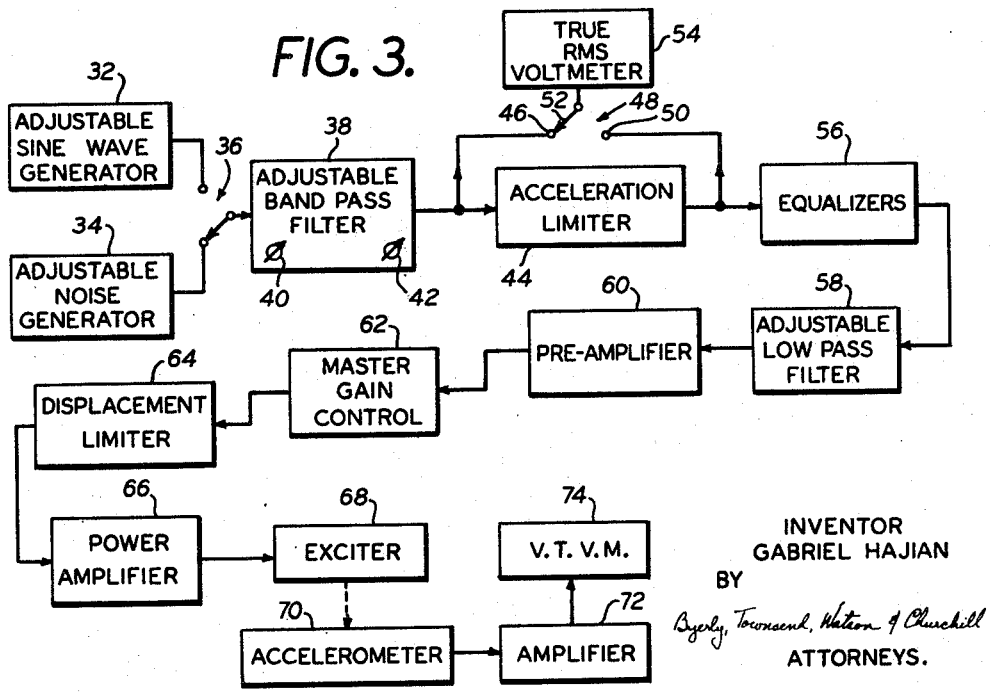
FIG. 3 is a block diagram of a complete vibration exciter system showing the location of the acceleration limiter with respect to the other components.

The acceleration limiter according to the present invention is particularly suited for clipping relative to the normalized value of sigma. However, with suitable calibration it can serve the dual function of limiting acceleration at some absolute value in terms of the gravitational unit $g$. It was pointed out above that when "sigma" limiting is employed it is permissable for the gain to vary between the limiter and the exciter although the input level to the clipper circuit of the limiter had to be controlled. When limiting is to be performed at an absolute value, however, it is necessary that the gain following the limiter be controlled whereas the gain preceding the clipper circuit of the limiter may be varied. As with the previous mode of operation, the acceleration limiter must be used in conjunction with an equalized system. With the system as shown in FIG. 3, a 100 cycle signal is fed to the limiter from the sine-wave generator 32. The true R.M.S. voltmeter 54 is connected to the output of the acceleration limiter 44. Now mentally it should first be determined how the clipping level adjustment is to be calibrated. That is, how many $g$ should be represented by each setting of the R.M.S. multiplier. For example, 1 could be 10 $g$, 2 could be 20 $g$ and so forth. It merely has to be remembered that the calibration of the clipping level adjustment is linear. Now with the clipping level control set opposite the position 1, adjust the bandwidth compensator 24 and the input compensator 28 both to their full clockwise position. That is, both amplifiers 12 and 14 are adjusted for minimum gain. With the master gain control 62 adjusted to prevent excitation of the exciter, feed the 100 cycle sine wave to the acceleration limiter by any suitable means until the clipping indicator 18 shows that limiting is just beginning. Now adjust the master gain control 62 until the peak acceleration as indicated by the vacuum-tube voltmeter 74 corresponds to the value chosen for a "Clipping Level" setting of 1. This completes the calibration of the acceleration limiter for this mode of operation. It should be understood that if the bandwidth should be restricted, the "BW Compensator" and/or the "Input Compensator" can be adjusted to provide additional gain in the acceleration limiter.

The acceleration limiter, when clipping, is a non-linear device, and hence introduces both high and low frequencies whenever multiple signals are present at the input. These spurious components are necessary to provide the desired action at the exciter table; however the system may not be capable of reproducing the entire range. Two system limitations are obvious: first, the exciter has a finite displacement limitation, and second, the system frequency response, due primarily to limitations in the exciter, is limited to 2 or 3 kilocycles. It is for this reason that it is desirable to employ the displacement limiter 64 and the low pass filter 58 after the acceleration limiter in order to afford absolute control over these limits.

Having described the invention with reference to a specific embodiment thereof, it will be understood that various changes may be made therein without departing from the true spirit of the invention as defined in the appended claims.

What is claimed is:

1. An acceleration limiter, for inclusion in a vibration exciter system at a point in the system where the signal voltage is proportionally related to the acceleration of the exciter table, comprising an adjustable level clipper circuit with a manual control having settings representing relative clipping level and calibrated in arbitrary units, an indicator coupled with said clipper circuit for providing an indication whenever clipping is taking place, and an adjustable gain amplifier for adjustably amplifying the signals fed to said clipper circuit, said amplifier including means for determining its adjustment at the appropriate level for exactly compensating for a change in gain before the limiter caused by an alteration of the bandwidth of the signal supplied to the limiter whereby the system gain preceding the clipper circuit can be maintained constant.

2. An acceleration limiter, according to claim 1, wherein the means for determining the amplifier adjustment comprises a manually adjustable gain control having an associated dial calibrated in terms of total bandwidth.

3. An acceleration limiter, for inclusion in a vibration exciter system at a point in the system where the signal voltage is proportionally related to the acceleration of the exciter table, comprising an adjustable level clipper circuit with a manual control having settings representing relative clipping level and calibrated in arbitrary units, an indicator coupled with said clipper circuit for providing an indication whenever clipping is taking place, a first adjustable gain device preceding said clipper circuit in the limiter arranged for exactly compensating for a change in gain before the limiter caused by an alteration of the bandwidth of the signals supplied to the limiter, a second adjustable gain device coupled in series with said first device before the clipper circuit and independently adjustable and arranged for exactly compensating for a change in signal level before the limiter caused by other than a change in bandwidth whereby the system gain preceding the clipper circuit can be maintained constant.

4. An acceleration limiter according to claim 3, wherein said second device comprises a manually adjustable control having an associated dial calibrated in terms of R.M.S. voltage.

5. An acceleration limiter, for inclusion in a vibration exciter system at a point in the system where the signal voltage is proportionally related to the acceleration of the exciter table, comprising an adjustable level clipper circuit with a manual control having settings representing relative clipping level and calibrated in arbitrary units, an indicator coupled with said clipper circuit for providing an indication whenever clipping is taking place, an adjustable gain amplifier for adjustably amplifying the signals feed to said clipper circuit, and a manually adjustable gain control for determining the adjustment of said amplifier, said gain control having settings calibrated in terms of bandwidth with the calibrations arranged such that the R.M.S. gain of the amplifier at any selected setting is approximately inversely proportional to the square root of the bandwidth corresponding to said setting thereby providing compensation for a change in gain before the limiter caused by an alteration of the bandwidth of the signals supplied to the limiter.

6. In a vibration exciter system in combination a source of noise signals, an adjustable band-pass filter for controlling the bandwidth of the noise signals, an acceleration limiter having an adjustable level clipper circuit and at least one adjustable gain amplifier, the output of the band-pass filter being fed through said amplifier to the clipper circuit, said amplifier being provided with a manual control having settings calibrated in terms of bandwidth which when set to the bandwidth of the band-pass filter causes the amplifier to compensate for the loss in gain due to restriction of the frequency band, an exciter, and means including equalizers coupling the output of said limiter to the exciter for supplying driving energy thereto.

7. In a vibration exciter system in combination a source of noise signals, an adjustable band-pass filter for controlling the bandwidth of the noise signals, an acceleration limiter having an adjustable level clipper circuit and two independently operative adjustable gain amplifiers, the output of the band-pass filter being fed through said amplifiers in tandem to the clipper circuit, one of said amplifiers being provided with a manual control having settings calibrated in terms of bandwidth which when set to the bandwidth of the band-pass filter causes the amplifier to compensate for the loss in gain due to restriction of the frequency band, means for measuring the R.M.S. signal level at the output of the band-pass filter, said other amplifier having a manually adjustable control with settings calibrated in terms of R.M.S. level for compensating for a change in signal level at the output of the filter caused by other than a change in the pass band of the filter, an exciter, and means including equalizers coupling the output of said limiter to the exciter for supplying driving energy thereto.

8. In a vibration exciter system in combination a source of noise signals, an acceleration limiter having an adjustable level clipper circuit and at least one adjustable gain amplifier for maintaining constant the signal level at the input to the clipper circuit, said clipper circuit being characterized by the production of high and low frequency components when clipping, means coupling said source of signals to said limiter, an exciter, and a group of components coupled in tandem and coupling said exciter to the output of said acceleration limiter, said group including equalizers, an adjustable low pass filter, a displacement limiter and a power amplifier.

References Cited in the file of this patent

UNITED STATES PATENTS

| | | |
|---|---|---|
| 2,297,084 | Swallow | Sept. 29, 1942 |
| 2,322,217 | Baird | June 22, 1943 |
| 2,341,135 | Baird | Feb. 8, 1944 |
| 2,538,760 | Brown et al. | Jan. 23, 1951 |
| 2,624,789 | Dean | Jan. 6, 1953 |
| 3,010,099 | Ross et al. | Nov. 21, 1961 |

UNITED STATES PATENT OFFICE
CERTIFICATE OF CORRECTION

Patent No. 3,141,325

July 21, 1964

Gabriel Hajian

It is hereby certified that error appears in the above numbered patent requiring correction and that the said Letters Patent should read as corrected below.

Column 1, line 62, for "necessray" read -- necessary --; column 2, line 5, for "lever" read -- level --; column 4, line 35, for "ievel" read -- level --; line 67, for "200", in bold face type, read -- 200 --, in regular type; line 74, for "limited" read -- limiter --; column 5, line 8, for "be" read -- the --; column 6, line 71, for "feed" read -- fed --.

Signed and sealed this 17th day of November 1964.

(SEAL)
Attest:

ERNEST W. SWIDER
Attesting Officer

EDWARD J. BRENNER
Commissioner of Patents